(12) United States Patent
Nakata et al.

(10) Patent No.: US 6,928,218 B2
(45) Date of Patent: Aug. 9, 2005

(54) FIBER PLATE, MANUFACTURING METHOD THEREOF, RADIATION IMAGING APPARATUS AND RADIATION IMAGING SYSTEM

(75) Inventors: Kohei Nakata, Tokyo (JP); Noriyuki Kaifu, Tokyo (JP); Osamu Hamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 10/356,470

(22) Filed: Feb. 3, 2003

(65) Prior Publication Data

US 2003/0164453 A1 Sep. 4, 2003

(30) Foreign Application Priority Data

Feb. 7, 2002 (JP) ........................................ 2002-030963
Dec. 27, 2002 (JP) ........................................ 2002-380952

(51) Int. Cl.$^7$ ........................... G02B 6/08; C03B 37/028
(52) U.S. Cl. .................... 385/116; 385/120; 65/408; 65/411
(58) Field of Search ................. 385/115–117, 120, 385/121; 65/406, 408, 409, 410, 411

(56) References Cited

U.S. PATENT DOCUMENTS

| | | | | |
|---|---|---|---|---|
| 3,216,807 A | * | 11/1965 | Woodcock | ................. 65/411 |
| 3,397,022 A | | 8/1968 | Cole | |
| 3,933,556 A | * | 1/1976 | Strack | ..................... 156/155 |
| 5,394,254 A | | 2/1995 | Cheng | |
| 5,554,850 A | * | 9/1996 | Hejazi | ....................... 250/367 |
| 5,563,414 A | | 10/1996 | Sklebitz | |
| 5,834,782 A | | 11/1998 | Schick et al. | |
| 6,447,354 B1 | * | 9/2002 | Hofmann et al. | ............ 445/24 |
| 6,455,860 B1 | * | 9/2002 | Mooney | ..................... 250/397 |

FOREIGN PATENT DOCUMENTS

JP        08-211199        8/1996

OTHER PUBLICATIONS

Nakayama, et al., "Fiber Optic Plate and Its Application", Hamamatsu Photonics K.K., pp. 1–6 (1990). (Translation).

* cited by examiner

Primary Examiner—Akm Enayet Ullah
Assistant Examiner—Omar Rojas
(74) Attorney, Agent, or Firm—Fitzpatrick, Cella, Harper & Scinto

(57) ABSTRACT

Disclosed is a technology for obtaining a large area fiber plate suited for downsizing a radiation imaging apparatus and reducing its cost and excellent of workability in the manufacturing process. A multi-fiber is manufactured by bundling and drawing a plurality of fibers to take a polygonal shape in section so that the multi-fibers can be air-tightly stacked without any air gap, a multi-fiber aggregate is manufactured by bundling and drawing the multi-fibers to take other polygonal shape in section that enables air-tight stacking with no air gap so as to be analogous to or different from the one polygonal shape in section, and there is manufactured a fiber plate configured by air-tightly bonding the multi-fiber aggregates to each other with a bonding agent without the air gap in a state of keeping the one or other polygonal shape in section after being drawn.

18 Claims, 19 Drawing Sheets

LARGE AREA FIBER PLATE

HEATING AND DRAWING

SECTIONAL VIEW OF SINGLE FIBER

HEATING AND DRAWING

SECTIONAL VIEW OF MULTI-FIBER

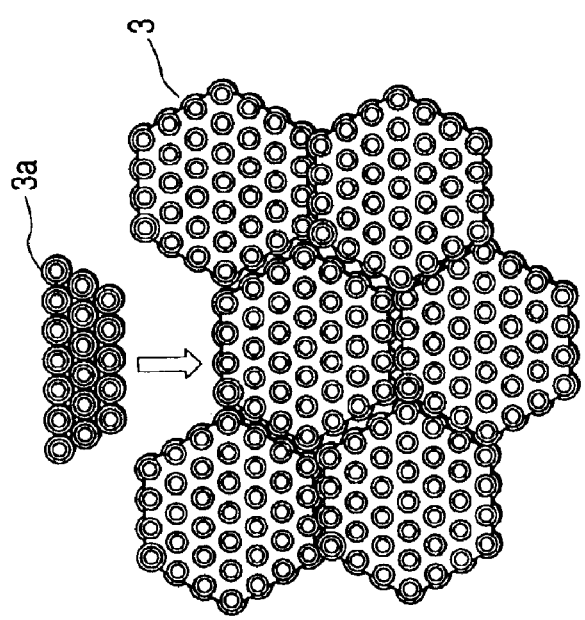
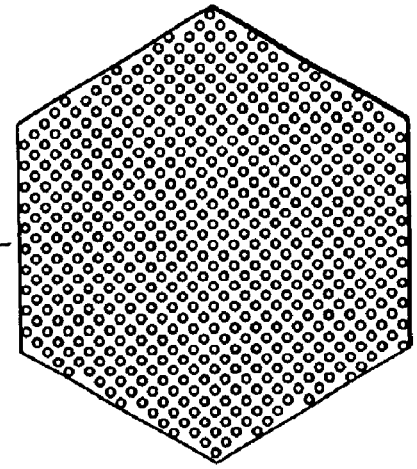
FIG. 4A
FIG. 4B
MULTIPLE FIBER LAMINATION
TO HEATING AND DRAWING PROCESS

LARGE AREA FIBER PLATE

STRUCTURE FORMED BY POLISHING AND THEN BINDING

ENLARGED VIEW OF BINDING SECTION

EMBODIMENT

FIBER PLATE, MANUFACTURING METHOD THEREOF, RADIATION IMAGING APPARATUS AND RADIATION IMAGING SYSTEM

BACKGROUND OF THE INVENTION

1. Field of the Invention

The present invention relates to a fiber plate (also known as a fiber optic plate), a manufacturing method thereof, a radiation imaging apparatus and a radiation imaging system. More particularly, the invention relates to a fiber plate utilized in the radiation imaging apparatus, which includes converting means for converting radiation into the light and a photoelectric converting device for converting light into electric signals, the fiber plate serving to guide the light from the converting means to the photoelectric converting device.

2. Related Background Art

In a radiation imaging apparatus, especially an X-ray imaging apparatus aimed at a medical treatment, there has hitherto been a demand for an X-ray imaging apparatus that is capable of capturing an X-ray dynamic image, having excellent image definition and a thin and large area input range. Further, there is also a demand for providing the thin and large area X-ray imaging apparatus at low costs, which is useful as an industrial non-destructive inspection apparatus as well as for medical treatment. In this type of X-ray imaging apparatus, when X-rays directly enter an imaging device, this causes noises when in a reading process, and there might be a case where semiconductor crystals in the imaging device are destroyed resulting in a decline of characteristics. An X-ray shielding fiber plate is therefore utilized. The use of the fiber plate enables the X-rays to be cut off without any blur of an optical image captured.

Examples of this type of fiber plate and the X-ray imaging apparatus using the fiber plate are (1) an X-ray detection apparatus (e.g., U.S. Pat. No. 5,563,414 B) having an enlarged area and structured such that the fibers of the fiber plate are inclined to prevent the non-light-receiving portions (peripheral circuits) of a CCD sensor from interfering with each other, (2) an X-ray detection apparatus (e.g., U.S. Pat. No. 5,834,782 B) having the enlarged area and structured such that the fiber plate has thickness-wise stepped portions so as to prevent the interference between the non-light-receiving portions of the CCD sensor, (3) an optical fiber plate (U.S. Pat. No. 3,397,022 B) having a structure that a light absorbing element is interposed between the fibers, (4) a fiber plate (U.S. Pat. No. 5,394,254 B) having a structure that a layer composed of glasses having physical rigidities and refractive indexes different from those of the optical fiber, is interposed between the optical fibers adjacent to each other, and (5) an X-ray imaging apparatus (U.S. Pat. No. 5,554,850 B, JP 8-211199 A, etc.) having an optical fiber scintillation plate including an optical fiber rod bundle inclined to an image surface.

FIG. 20 is a schematic sectional view of the X-ray detection apparatus having the configuration (1) given above. FIG. 20 shows a phosphor 3 constructed of a scintillator for converting the X-rays into visible light, an individual fiber plate 2A composed of optical fibers for guiding, toward an imaging device 1A, the visible light into which the phosphor 3 has converted the X-rays, and the imaging device 1A for converting the visible light guided by the individual fiber plate 2A into electric signals.

In this X-ray imaging apparatus, the individual fiber plate 2A is inclined to the imaging device 1A, and a processing circuit or the like for processing the electric signals from each imaging device 1A is provided between the individual fiber plates 2A.

FIG. 21 is a schematic perspective view of the X-ray detection apparatus having the configuration (2) given above. Note that the same components as those in FIG. 20 are marked with the same symbols in FIG. 21. As illustrated in FIG. 21, for instance, three pieces of imaging devices 1A are set as one group, and a stepped portion is provided for every group in a way that partially changes a length of the fiber plate 2, whereby a processing circuit etc. can be provided for each imaging device 1A.

In the configuration (1) given above, however, light guide surfaces (light incidence/exit surfaces) intersecting obliquely the axis of the optical fiber are provided, and the axes of the optical fibers of the fiber plate are disposed so as to intersect each other. This configuration makes it difficult to further downsize the X-ray imaging apparatus.

On the other hand, the configuration (2) given above brings about a further increase in size of the X-ray imaging apparatus. Moreover, since an alignment of each stepped portion with the imaging device requires a strict accuracy, the number of manufacturing processes increases, and a high-accuracy alignment apparatus is needed. In view of these factors, the configuration (2) given above is ruled out of the reality.

Further, in the configuration (3) given above, a gap is formed between the fiber and the light absorbing element, and the X-ray traveling through this gap penetrates the fiber plate and cannot be completely absorbed.

In the configuration (4) given above, the glass is used between the fibers, and hence the pressure and the temperature must be set high enough to soften the glass in the manufacturing process. In fact, it is difficult to attain the large area configuration. Further, a yield inevitably decreases due to distortions and deformations.

The configuration (5) discloses a structure of the optical fiber plate wherein the fiber axis is inclined to the image surface but does not disclose specific conditions taking into consideration a thickness of a bonding layer between the fibers, wherein the X-rays are sufficiently absorbed by the fiber plate.

Thus, the conventional X-ray imaging apparatuses are not necessarily sufficient in terms of downsizing the X-ray imaging apparatuses, reducing the costs thereof, improving the workability in the manufacturing process, and so on.

SUMMARY OF THE INVENTION

Accordingly, it is an object of the present invention to provide a large area fiber plate suited for downsizing a radiation imaging apparatus and reducing costs thereof and having excellent workability in a manufacturing process, as well as an improved radiation imaging apparatus and a radiation imaging system.

It is another object of the present invention to provide a fiber plate manufacturing method capable of providing a large area fiber plate, the radiation imaging apparatus and the radiation imaging system at low costs, as well as a radiation imaging apparatus manufacturing method.

A fiber plate according to the present invention is constructed to include a plurality of fibers and multi-fibers formed by bundling and drawing the plurality of fibers to take a polygonal shape in section so that the multi-fibers can be air-tightly stacked without any air gap. The fiber plate is configured by air-tightly bonding the multi-fibers to each other with a bonding agent without the air-gap in a state of keeping the polygonal shape in section after being drawn.

Further, a fiber plate according to another aspect of the present invention is constructed to include a plurality of fibers, multi-fibers formed by bundling and drawing the plurality of fibers to take one polygonal shape in section so that the multi-fibers can be air-tightly stacked without any air gap, and a multi-fiber aggregate. The multi-fiber aggregate is formed by bundling and drawing the multi-fibers to take another polygonal shape in section that enables air-tight stacking with no air gap so as to be analogous to or different from the one polygonal shape in section. The fiber plate is configured by air-tightly bonding the multi-fiber aggregates to each other with a bonding agent without the air gap in a state of keeping the one or another polygonal shape in section after being drawn.

Further, in the fiber plates described above, an axis of each of the fibers is preferably inclined to a normal line of a light guide surface of the fiber plate.

A fiber plate manufacturing method according to the present invention includes a step of manufacturing a multi-fiber by bundling and drawing a plurality of fibers to take a polygonal shape in section so that the multi-fibers can be air-tightly stacked without any air gap. The method also includes a step of manufacturing a fiber plate by air-tightly bonding the multi-fibers to each other with a bonding agent without the air-gap in a state of keeping the polygonal shape in section after being drawn.

Further, a fiber plate manufacturing method according to another aspect of the present invention includes a step of manufacturing a multi-fiber by bundling and drawing a plurality of fibers to take one polygonal shape in section so that the multi-fibers can be air-tightly stacked without any air gap. The method also includes a step of manufacturing a multi-fiber aggregate by bundling and drawing the multi-fibers to take another polygonal shape in section that enables air-tight stacking with no air gap so as to be analogous to or different from the one polygonal shape in section. Further, the method includes a step of manufacturing a fiber plate by air-tightly bonding the multi-fiber aggregates to each other with a bonding agent without the air gap in a state of keeping the one or another polygonal shape in section after being drawn.

A radiation imaging apparatus according to the present invention includes a wavelength converting member for converting radiation into a light, a photoelectric converting element for converting the light into an electric signal, and the fiber plate according to the present invention provided between the wavelength converting member and the photoelectric converting element.

A radiation imaging system according to the present invention includes the radiation imaging apparatus according to the present invention, signal processing means for processing a signal from the radiation imaging apparatus, recording means for recording a signal from the signal processing means, display means for displaying the signal from the signal processing means and a radiation source for generating the radiation.

BRIEF DESCRIPTION OF THE DRAWINGS

FIGS. 4A and 4B are views showing a configuration explanatory of the fiber plate manufacturing method in the first embodiment of the present invention;

DETAILED DESCRIPTION OF THE PREFERRED EMBODIMENTS

The present invention will hereinafter be discussed with reference to the accompanying drawings.

(First Embodiment)

FIGS. 1A and 1B through 6 are explanatory views showing a method of manufacturing a fiber plate according to the present invention.

Figure 1A:
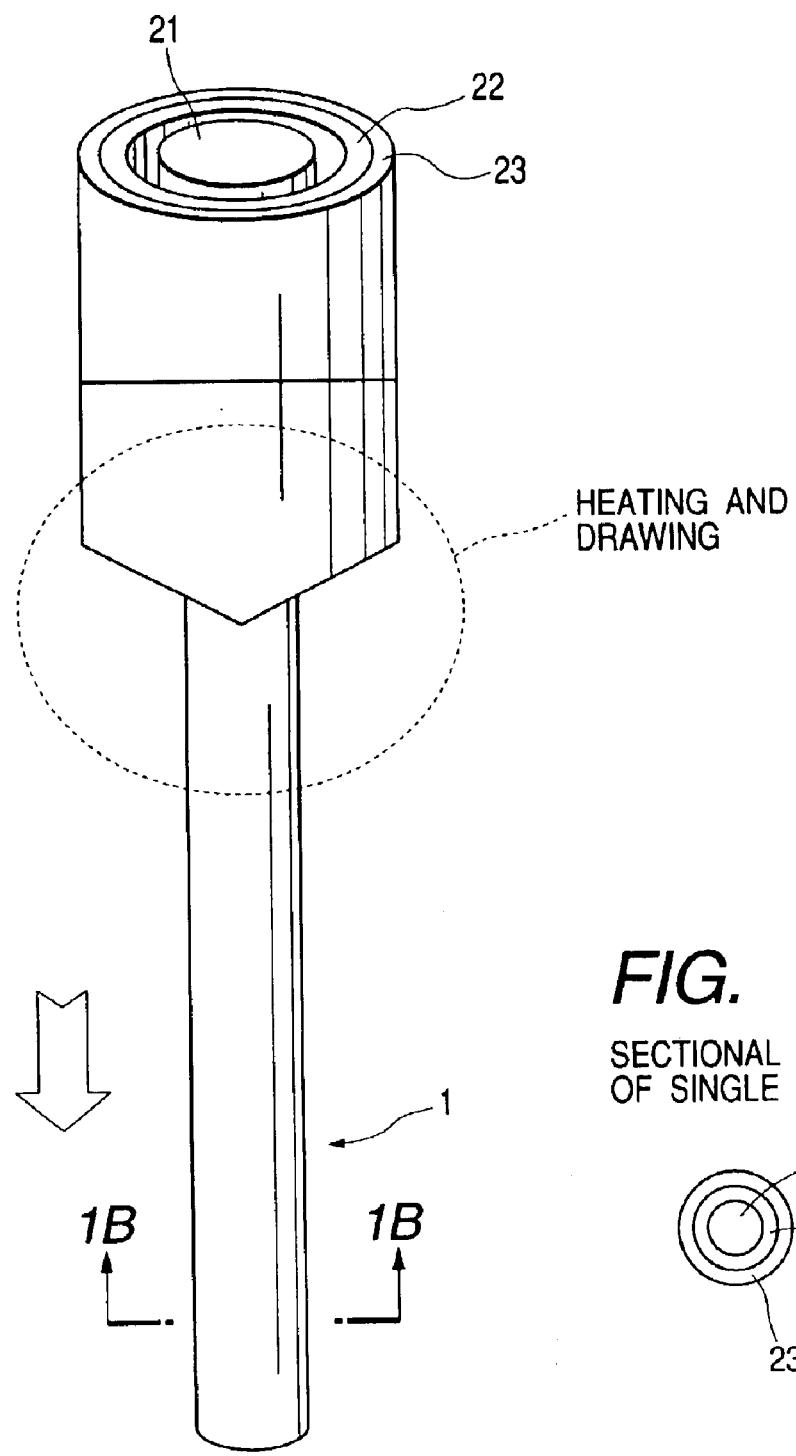
FIGS. 1A and 1B are views showing a configuration explanatory of a fiber plate manufacturing method in a first embodiment of the present invention.
Figure 1B:
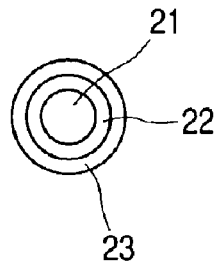

To start with, a single fiber is manufactured. FIG. 1A is the view showing a method of manufacturing the single fiber. FIG. 1B is a sectional view taken along the line 1B—1B in FIG. 1A, showing the single fiber. The single fiber is constructed of a central core glass 21, a clad glass 22 covering the periphery of the core glass 21, and an absorbent glass 23. A refractive index $n_1$ of the core glass 22 and a refractive index $n_2$ of the clad glass 22 determine an numerical aperture of the fiber.

$$N.A. = \sin\theta = SQR(n_1^2 - n_2^2)(n_1 > n_2)$$

A composite body consisting of the core glass, the clad glass and the absorbent substance is passed through a heating apparatus and thus drawn, thereby obtaining a single fiber 1 taking a sectional configuration analogous to that of the composite body.

At this time, the composite body is heated and drawn at such a temperature that a viscosity of each glass is on the order of $10^5$ to $10^9$ poise (dPa·s).

If expansion coefficients of the respective glasses are set such as core glass≧clad glass≧absorbent glass, an uniform stress occurs after being drawn, with the result that a strength of the fiber increases.

Figure 3A:
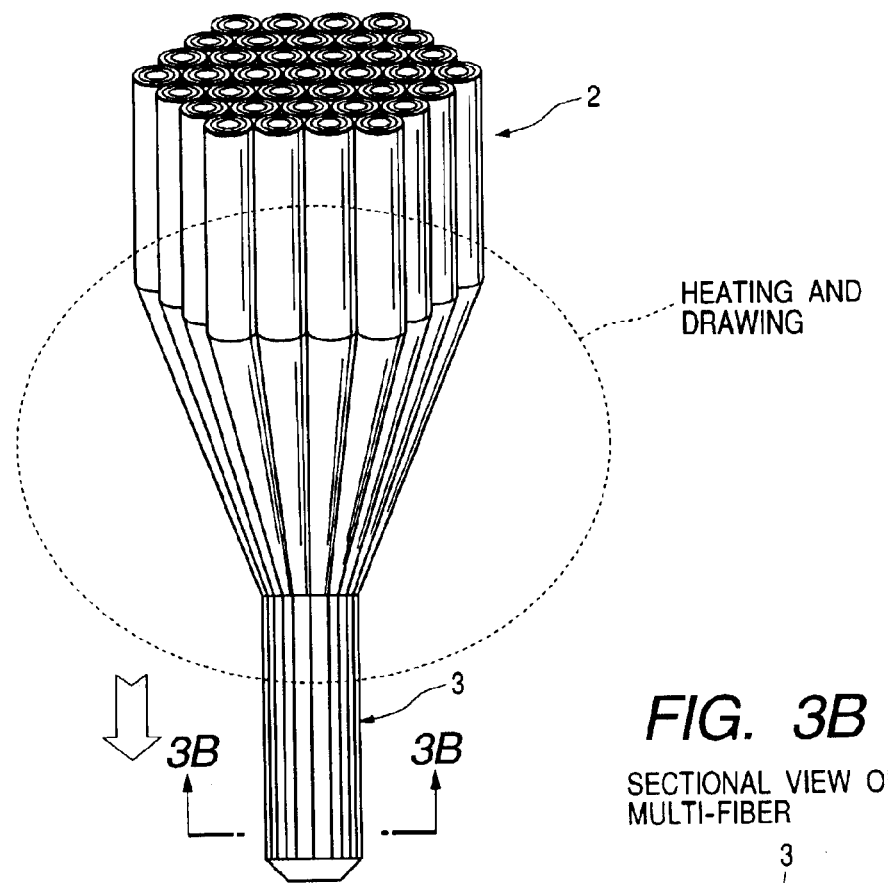
FIGS. 3A and 3B are views showing a configuration explanatory of the fiber plate manufacturing method in the first embodiment of the present invention.
Figure 3B:
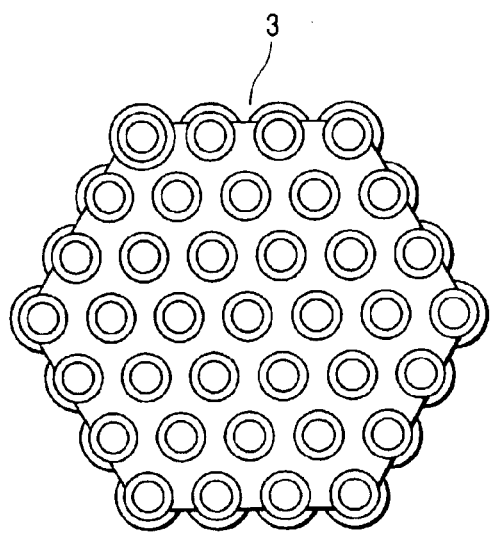

Next, a multi-fiber is manufactured by using the single fiber 1. FIGS. 3A and 3B are views illustrating a method of manufacturing the multi fiber in a way that laminates the single fibers and draws these fibers by heating. FIG. 3B is a sectional view taken along the line 3B—3B in FIG. 3A, showing the multi-fiber.

Figure 2A:
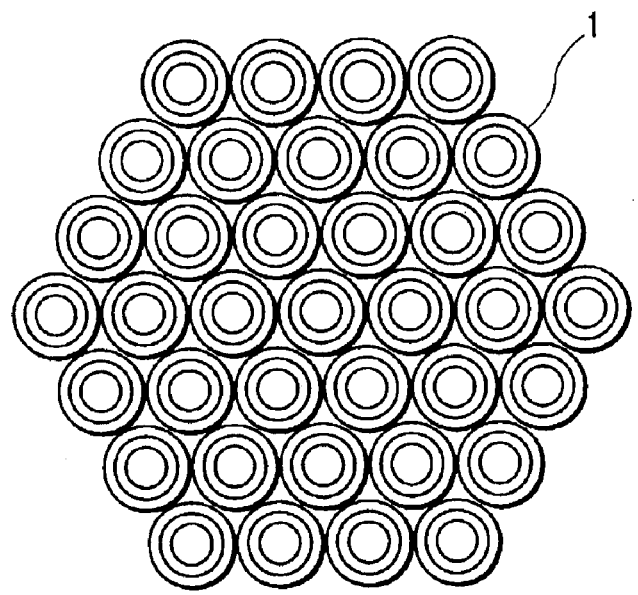
FIGS. 2A and 2B are views showing a configuration explanatory of the fiber plate manufacturing method in the first embodiment of the present invention.
Figure 2B:
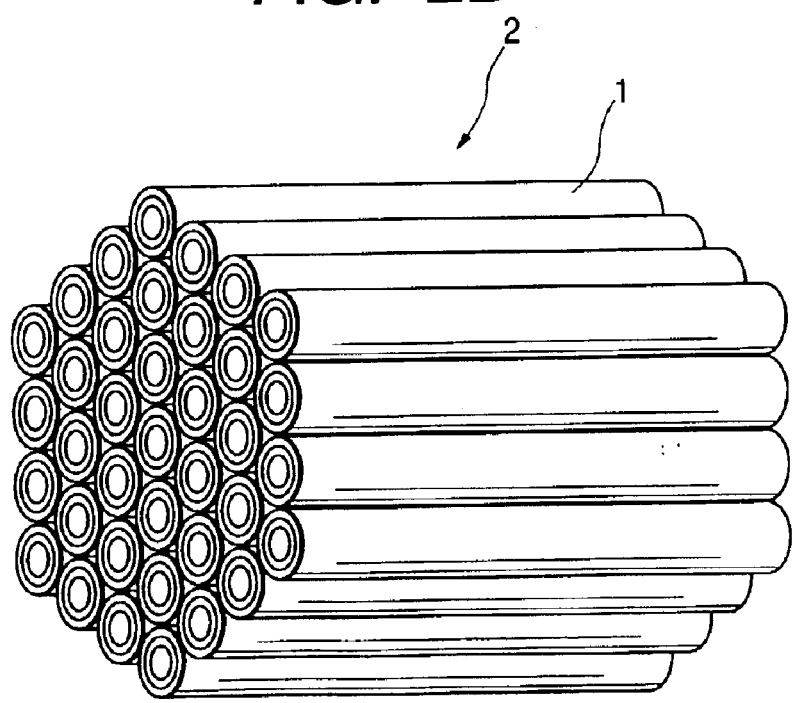

FIG. 2A illustrates a fiber lamination into which the single fibers are laminated. As shown in FIG. 2A, the single fibers 1 are aligned in the lengthwise direction, thereby forming the fiber lamination 2. The fiber lamination 2 is formed by bundling the single fibers so that its section takes a hexagonal shape, however, the section may assume other configurations on the condition that the manufactured multi-fiber has such a shape as to air-tightly laminate the single fibers without any air gap therebetween.

As illustrated in FIG. 3B, the fiber lamination 2 of the single fibers is, as in the case shown in FIGS. 1A and 1B, drawn by heating, thereby obtaining a multi-fiber 3. When in the heating and drawing process, a glass characteristic is selected so that a glass viscosity of the absorbent glass at a heating/drawing temperature thereof is lower than those of the core glass and the clad glass, whereby the absorbent glass can, as seen in the sectional view of the multi-fiber in FIG. 3B, fill air gaps between the respective single fibers.

Next, a multiple fiber (which may be defined as an aggregate of the multi-fibers) is manufactured by use of the multi-fibers described above. FIGS. 4A and 4B show a method of manufacturing the multiple fiber. A multiple fiber lamination is formed in a way that aligns the multi-fibers in the lengthwise direction. As illustrated in FIG. 4A, a multiple fiber lamination 4 with no gap is obtained by filling an air gap formed when laminating the multi-fibers 3 each taking the hexagonal shape with a trapezoidal multi-fiber 3a. The fiber lamination 4 is herein formed by laminating the multi-fibers so as to take the hexagonal shape in section thereof, however, other configurations may also be taken if configured to enable an air-tight lamination of the multiple fiber. As in the case shown in FIGS. 1A and 1B, the multiple fiber is obtained by performing the heating and drawing process.

Figure 5:
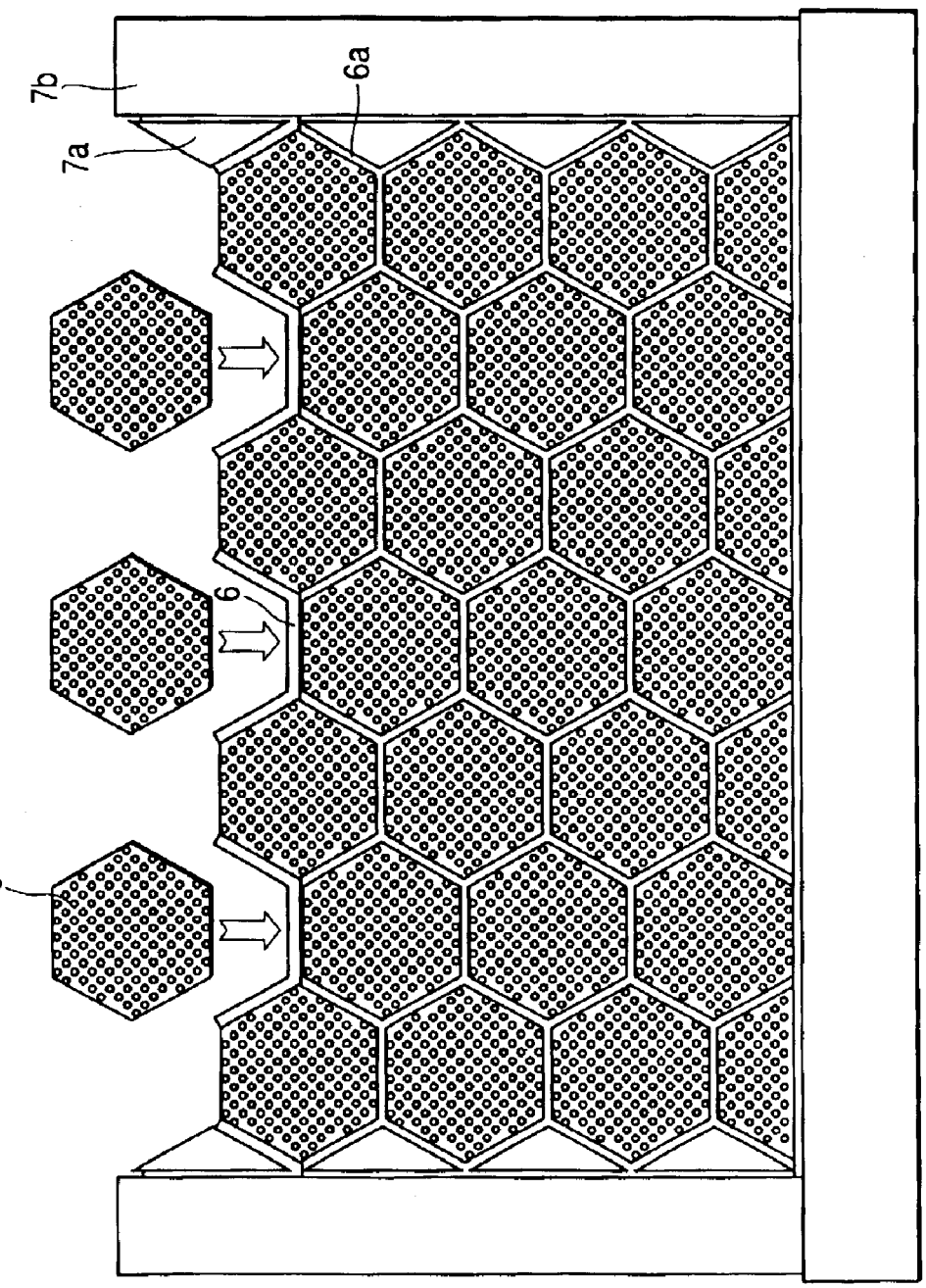
FIG. 5 is a view showing a configuration explanatory of the fiber plate manufacturing method in the first embodiment of the present invention.

Next, a fiber plate is manufactured by use of the multiple fibers (the multi-fiber aggregate) described above. As shown in FIG. 5, the multiple fibers 5 are laminated while applying a bonding agent 6 containing an X-ray shielding filler between the multiple fibers 5. The reference symbol 6a represents a hardened bonding agent. The multiple fibers 5 are laminated only on sections effective as an FOP (Fiber Optical Plate), and portions peripheral to the FOP are formed as blank glass blocks 7a, 7b (the block 7a is a triangular pillar, and the block 7b is a flat plate.), thereby making it possible to decrease a quantity of the high-cost multiple fibers for use. After hardening the bonding agent, the whole block is cut off at a right angle to the lengthwise direction of the fiber and polished (a light guide surface of the fiber plate is polished), whereby the FOP can be obtained. The light guide surfaces of the fiber plate are upper and lower main surfaces (light incidence/exit surfaces).

The first embodiment has exemplified the EMA type wherein the absorbent body is disposed along the periphery of the single fiber. In the case of an ISA type, however, it cannot be expected that the air gap between the fibers is filled with the absorbent glass, and hence the bonding agent permeates into the air gap from a side end surface of the fiber lamination.

Figure 6:
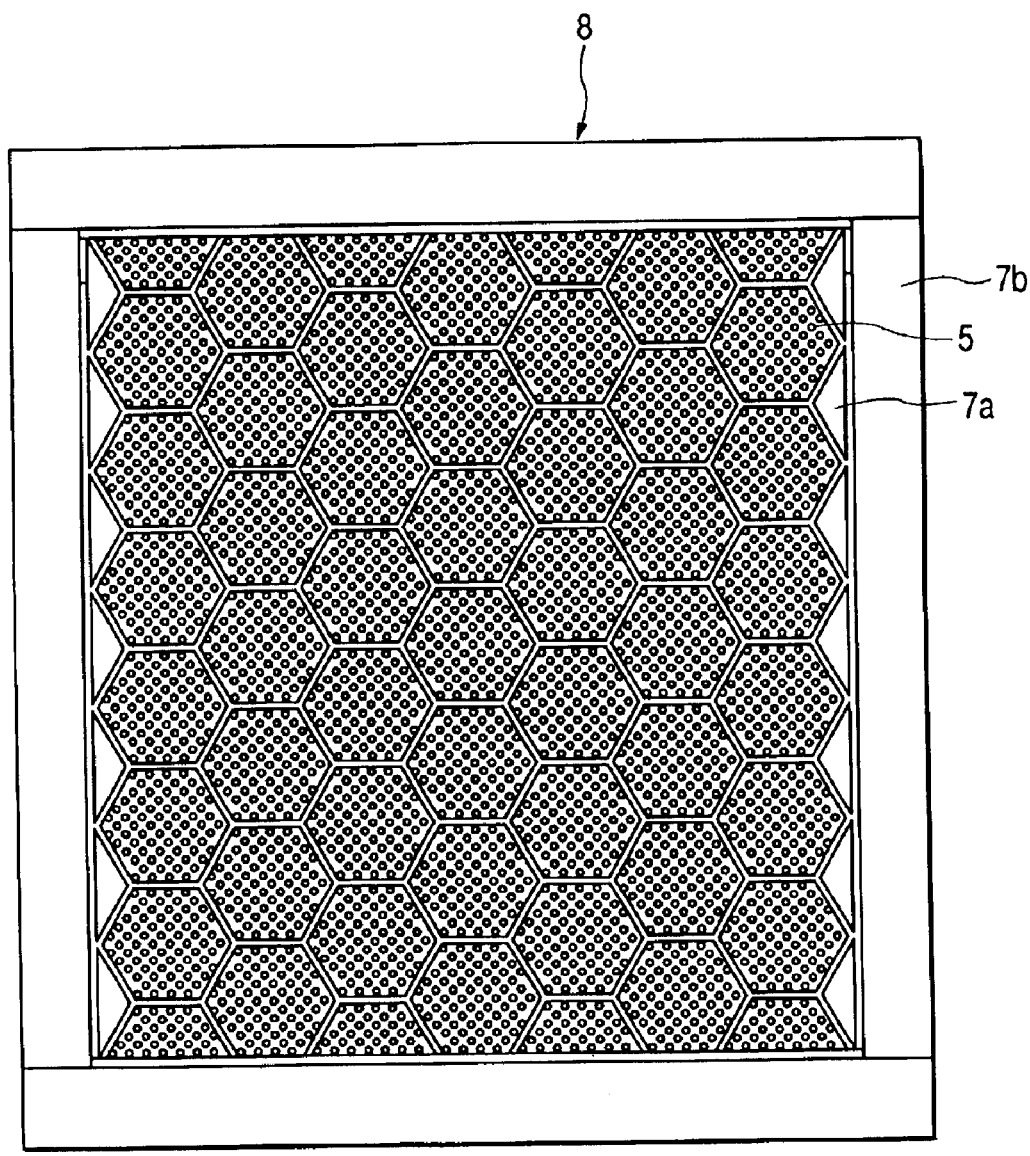
FIG. 6 is a view showing a configuration explanatory of the fiber plate manufacturing method in the first embodiment of the present invention.

Further, according to the first embodiment, the fiber plate is manufactured by using the multiple fibers and may also be manufactured, as shown in FIGS. 5 and 6, by use of the multi-fibers shown in FIGS. 3A and 3B.

Note that specific examples of the bonding agent are an ethylene vinyl acetate copolymer, a carboxyl denatured ethylene vinyl acetate copolymer, an ethylene isobutyl acrylate copolymer, polyamide, polyester, polymethyl methacrylate, polyvinyl ether, polyvinyl butyral, polyurethane, a styrene butylene styrene (SBS) copolymer, a carboxyl denatured SBS copolymer, a styrene isoprene styrene (SIS) copolymer, a styrene ethylene butylene styrene (SEBS) copolymer, a maleic acid denatured SEBS copolymer, polybutadiene rubber, chloroprene rubber (CR), carboxyl denatured CR, styrene butadiene rubber, an isobutylene isoprene copolymer, acrylonitrile butadiene rubber (NBR), carboxyl denatured NBR, epoxy resin, silicone rubber (SR) and so on. Among these materials, one type of material is solely used, or two or more types of materials are combined for use. These bonding agents are hardened at a normal temperature or approximately 100° C. at the maximum, and are bondable without setting the temperature high enough to soften the core glass and the clad glass.

Further, as the necessity arises, there may be properly added a phenol resin as a reactive assistant and a cross-linking agent, a polyol class, an isocyanate class, a melamine resin, a urea resin, an urotropin resin, an amine class, acid anhyride, peroxide, metal oxide, organic metallic salt such as trifluoroacetate chrome salt, titanium, zirconia, alkoxide such as alumnium, an organic metallic compound such as dibutyltin dioxide, 2,2-diethox-acetophenone, a photo-initiator such as benzil, an amine class, a phosphoric compound, a sensitizer such as a chloric compound, further, a hardening agent, a vulcanizing agent, a control agent, a deterioration inhibitor, a refractory additive agent, a thermal conduction improver, a softening agent, a coloring agent, a variety of coupling agents, a metal deactivator and so on.

Moreover, a material used as the X-ray shielding filler is at least one class of metal or an alloy containing at least one class of metal or a compound of at least of one class of metal selected from iron, cobalt, nickel, copper, zinc, silver, tin, gadolinium, tungsten, platinum, gold, lead and bismuth. The metal, alloy and compound described above may be used in a particulate state. In this case, inorganic or organic particles (carbon particles, plastic balls) covered with plating, sputtering etc. can be also used.

The large area fiber plate according to the first embodiment involves the use of the radiation shielding filler at the bonded portion and is therefore capable of preventing the radiation from penetrating through this joined portion.

FIG. 6 shows the large area fiber plate manufactured by the manufacturing method described above. A large area fiber plate 8 shown in FIG. 6 is, for example, 30 cm×30 cm in size and approximately 3 mm in thickness. It is preferable that this size be slightly larger than an effective area of an X-ray imaging apparatus to be configured.

The thickness is required to be thick enough to shield from the X-rays. In the case of the fiber using, e.g., a lanthanum-series glass, if the thickness is 3 mm, the X-rays are attenuated down to $1/10$- through $1/1000$. This value changes depending on a wavelength of the X-rays in use and may therefore be determined corresponding to the wavelength used in the apparatus.

Figure 7:
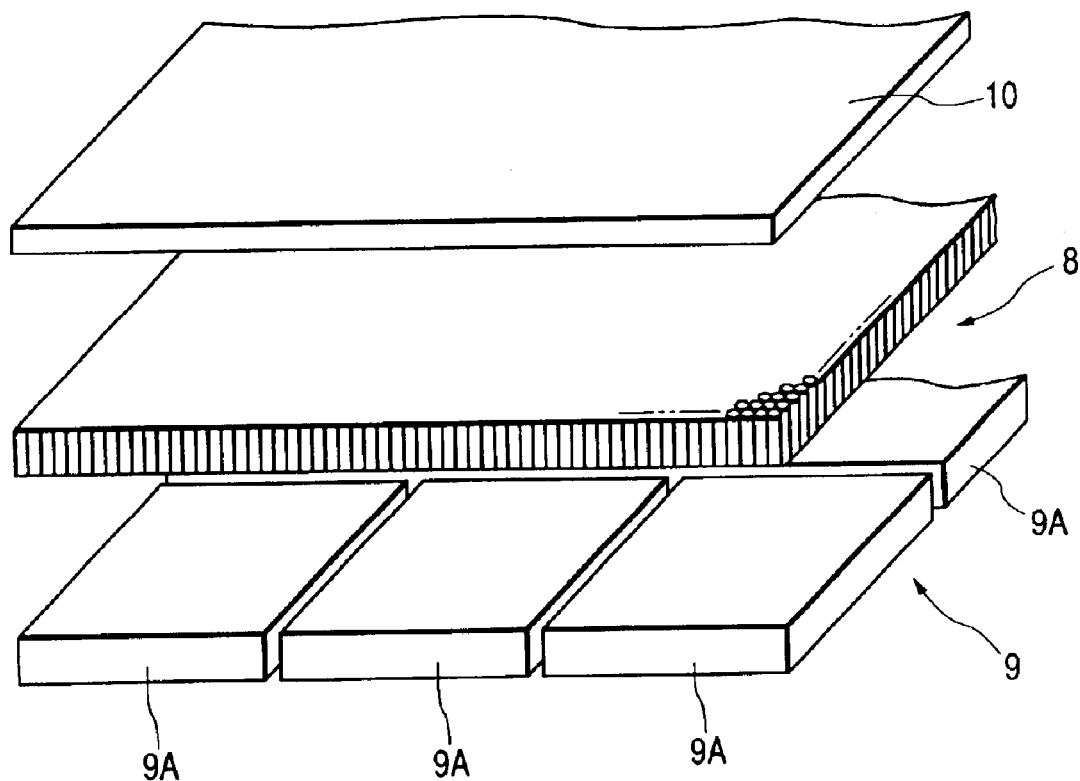
FIG. 7 is a schematic view showing a basic configuration of an X-ray imaging apparatus using the fiber plate described above.
Figure 8:
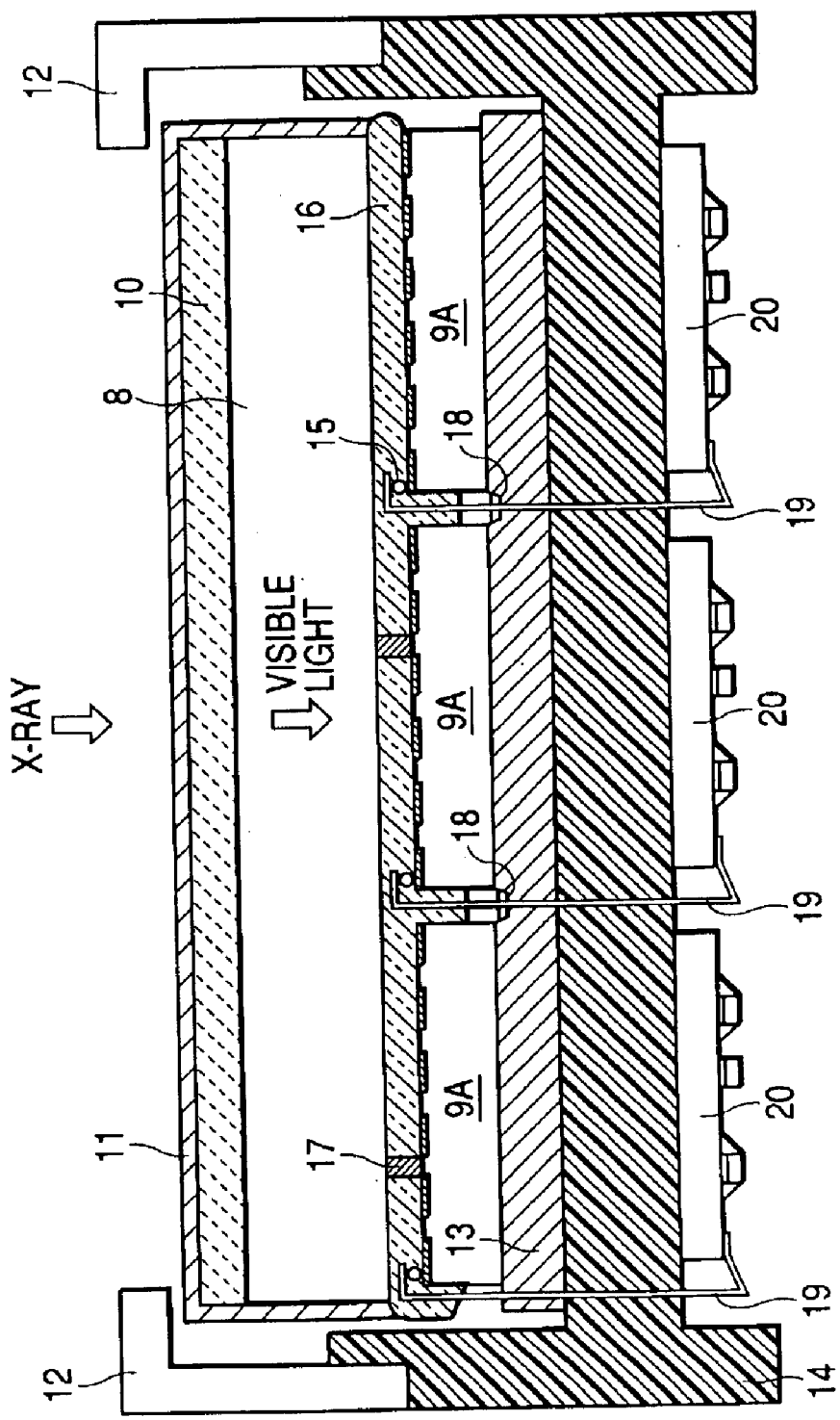
FIG. 8 is a sectional view showing a specific example of the configuration of the X-ray imaging apparatus of the present invention.

The large area fiber plates are combined as illustrated in FIGS. 7 and 8, thereby configuring the X-ray imaging apparatus.

FIG. 7 is a schematic view showing a basic configuration of the X-ray imaging apparatus using the fiber plates described above.

Referring to FIG. 7, an imaging device designated by 9A is constructed of integrated circuit chips such as a CCD image sensor chip, a CMOS image sensor chip, a bipolar image sensor chip, a CMD image sensor chip and a thin film transistor image sensor chip, and a large area imaging device (photoelectric converting device) 9 is configured by arraying the plurality of imaging devices 9A.

The numeral 8 represents the large area fiber plate shown in FIG. 6, of which only the fiber portion is herein illustrated with the glass block omitted. The light guide surfaces of the fiber plate are the upper and lower main surfaces (light incidence/exit surfaces).

Further, the numeral 10 designates a wavelength converting member defined as a layer member composed of a material called a scintillator or phosphor, such as alkali metal halide etc. typified by gadolinium sulfide oxide such as $Gd_2O_2S(Tb)$ and cesium iodide such as CsI(Tl).

It is preferable that a light guide area of the bonded large area fiber plate 8 be set equal to or larger than an effective light receiving area of the bonded large area imaging device 9, and that an area of the a wavelength converting member 10 be set equal to or larger than a light guide area of the bonded large area fiber plate 8.

When the radiation enters, from above in FIG. 7, an upper surface of the wavelength converting member 10, the wavelength converting member 10 emits the light of a visible light region. The fiber plate 8 disposed between the wavelength converting member 10 and the imaging device 9 guides the same light to a light receiving portion of the imaging device 9. The light incident upon the light receiving portion is photoelectrically converted per pixel and read as electric signals.

Herein, the fiber plate 8 is capable of preventing the radiation from entering the imaging device 9, whereby a malfunction of the imaging device and an occurrence of noises can be restrained.

Note that the imaging apparatus of the present invention can be preferably applied to the X-ray imaging apparatus, however, the application thereof is not limited particularly to the X-ray imaging apparatus and can be applied to radiation imaging apparatuses for detecting radiation images of α-, β-and λ-rays other than the X-rays.

Further, the light is the electromagnetic wave of a detectable-by-the-pixel wavelength region, and includes the visible light.

FIG. 8 is a sectional view showing a specific example of the configuration of the X-ray imaging apparatus according to the present invention. FIG. 8 illustrates the apparatus including the phosphor (wavelength converting member) 10 as the scintillator for converting the X-rays into the light such as the visible light having a wavelength detectable by the imaging device (photoelectric converting device), the plurality of fiber plates 8 for guiding the light converted by the wavelength converting member 10 to the imaging device, and the imaging device 9 (constructed of the plurality of imaging device chips 9A) provided with photoelectric conversion light receiving devices for converting the light into the electric signals.

This apparatus has, as the necessity arises, a transparent bonding material 16, exhibiting an excellent elasticity, for bonding the large area fiber plate 8 to the imaging device 9 containing a plurality of pixels, flexible substrates 19 having wires for outputting outside the electric signals from the respective imaging device chips 9A, bumps 15 for electrically connecting the flexible substrates 19 to the imaging device chips 9A, printed boards 20 to which the flexible substrates 19 are connected, an aluminum protection sheet 11 for protecting the phosphor 10, a base board 13 mounted with the imaging device 9, a base box member for retaining the base board 13, a box cover 12 provided on the base box member 14, a spacer 17, provided between the imaging device 9 and the fiber plate 8, for keeping a fixed interval, and a joint filler 18 for filling a gap between the fiber plate 8 and the imaging device 9 with the transparent bonding material 16.

The X-ray imaging apparatus shown in FIG. 8 is manufactured in a way that bonds the imaging device 9 to the large area fiber plate 8 with the transparent bonding material 16.

As discussed above, the manufacturing method in the first embodiment is capable of:

(1) manufacturing the large area fiber plate with a high yield;
(2) obtaining a high-quality image without any optically discontinuous dots because of air-tightly laminating the multi-fibers or the multi-fiber aggregates with no air gap and thus bonding them;
(3) reducing manufacturing costs by eliminating the necessity of the large-scale manufacturing apparatus as by press working; and
(4) necessitating neither cut-out processing nor polish processing because of no distortion of the peripheral portion in the first embodiment, though the periphery touching the die has a large distortion of the fiber and therefore the cut-out processing and the polish processing are needed in the case of utilizing the press working, and further acquiring the high yield as well. Moreover, there is no futility of the fiber materials, and the apparatus can be produced at lower costs.

(Second Embodiment)

Figure 9:
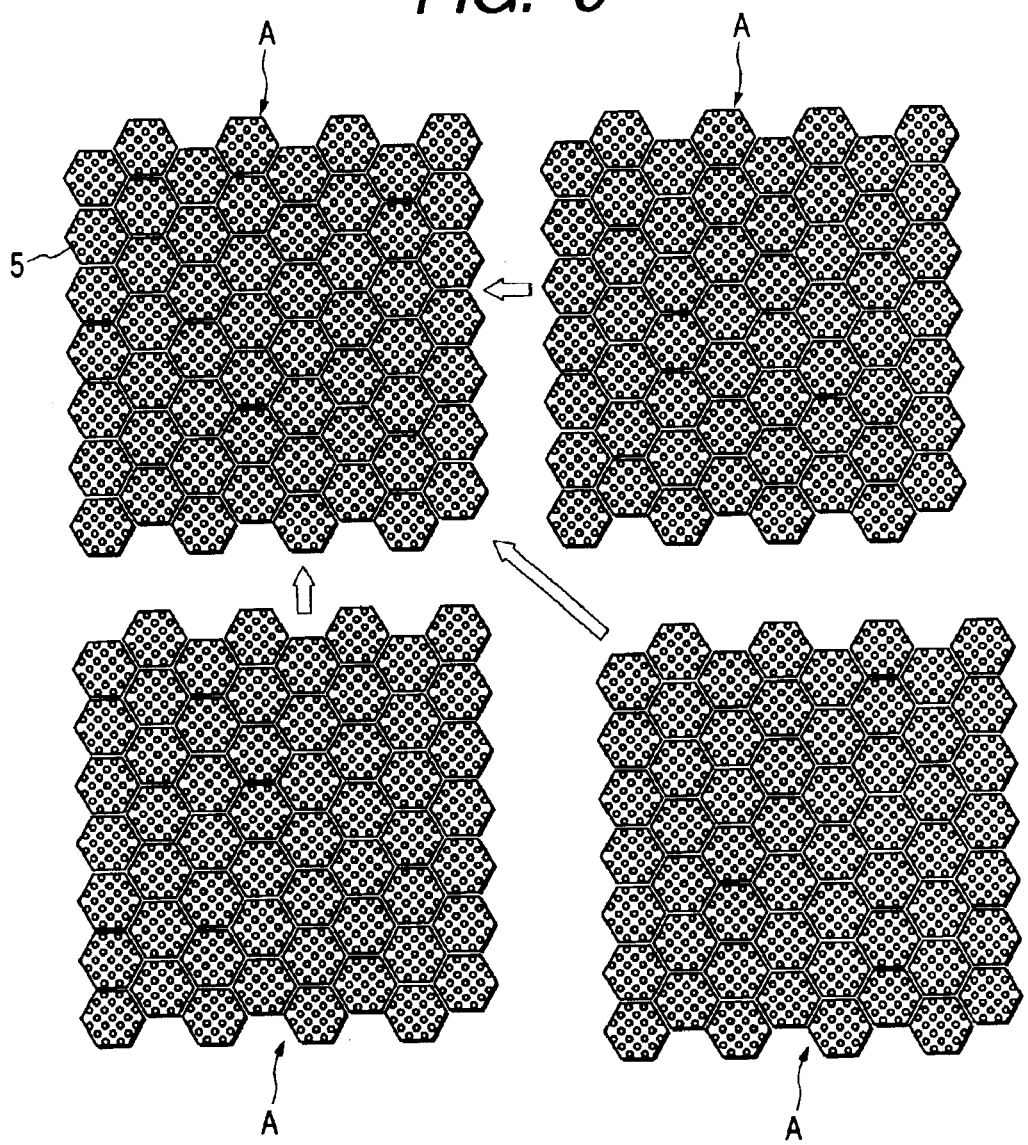
FIG. 9 is a view showing a configuration explanatory of a fiber plate manufacturing method in a second embodiment of the present invention.

As shown in FIG. 9, an intermediate-area fiber plate (fiber block) A having an easy-to-manufacture size to some extent and taking a square shape as in dimensions of, e.g., 15 cm×15 cm, is manufactured, and a large area fiber plate is configured by combining a plurality of fiber plates A. The fiber plates A may be, after being combined, bonded and may also be pressed against each other from the periphery thereof. The bonding agent may contain the X-ray shielding filler.

The manufacturing method of the intermediate-area fiber plate (fiber block) A is the same as in the first embodiment.

In this case, neither the blank glass block nor the trapezoidal multi-fiber as shown in FIG. 5 are used. According to the second embodiment, as illustrated in FIG. 9, two or three sides of the hexagon are exposed to the bonding surface, wherein a recessed portion of one intermediate-area fiber plate A is bonded to a protruded portion of the other intermediate-area fiber plate A by use of the bonding agent so that these recessed and protruded portions engage with each other.

A small-scale manufacturing apparatus suffices because of having no such large area as in the first embodiment, and the high yield is obtained. Further, the bonding surface is not a simple flat surface, thereby exhibiting an effect that the bonding strength rises.

Figure 10A:
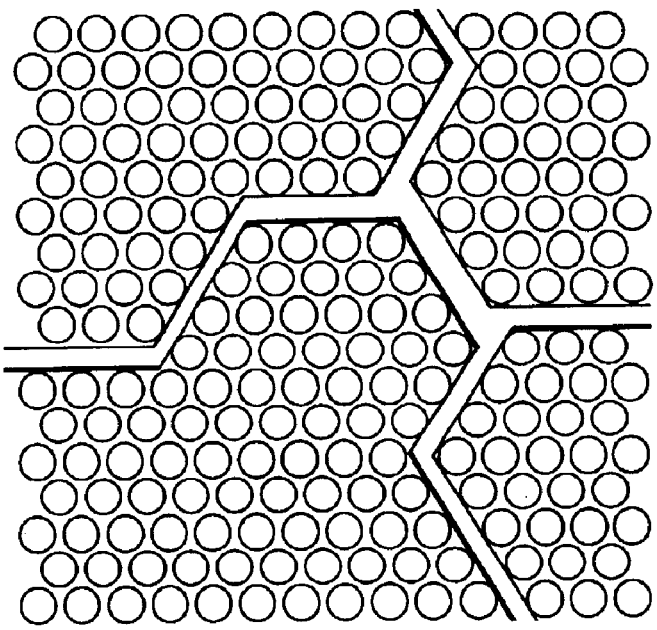
FIG. 10A is a view showing a configuration in which side surfaces of square fiber plates are polished and then binded.
Figure 10B:
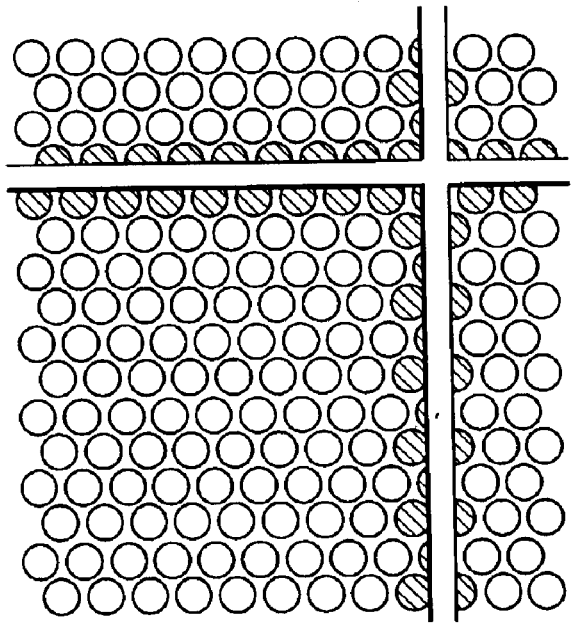
FIG. 10B is a view showing a configuration of the fiber plate in the second embodiment.

Further, for instance, by contrast with the configuration of polishing and bonding the plates after being pressed in a square or rectangle, the number of processes is small, the manufacturing apparatus is small-scale, and there is no futility of the materials consumed. Moreover, no fiber becomes ineffective on the bonding surface, the light is utilized at a high efficiency, and the image undergoes no disturbance with no loss of optical image. FIG. 10A is a view showing a structure where the side surfaces of the square-shaped fiber plates are polished and then binded. FIG. 10B is a view showing a structure of the fiber plate in the second embodiment. The fibers shown by hatching in FIG. 10A are unable to guide the light and become ineffective.

Hence, it is possible to configure the X-ray imaging apparatus capable of obtaining the satisfactory image at low costs.

Figure 11:
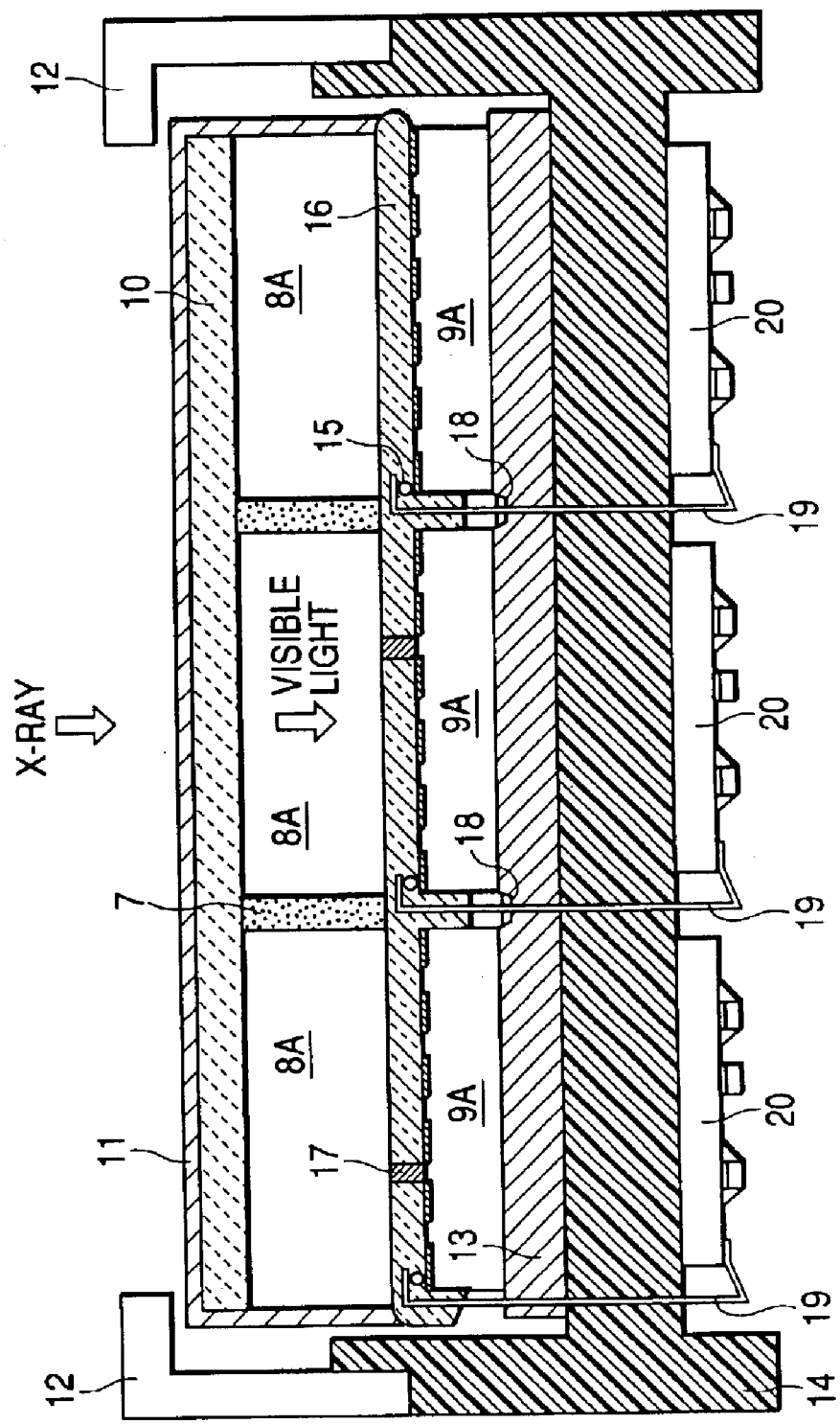
FIG. 11 is a sectional view showing a specific example of another configuration of the X-ray imaging apparatus of the present invention.

FIG. 11 is a sectional view showing a specific example of the configuration of the X-ray imaging apparatus using the above-mentioned fiber plates according to the present invention. The same components as those of the configuration in FIG. 8 are marked with the same symbols. The numeral 7 represents a bonding agent for bonding the intermediate-area fiber plates to each other.

(Third Embodiment)

Figure 12B:
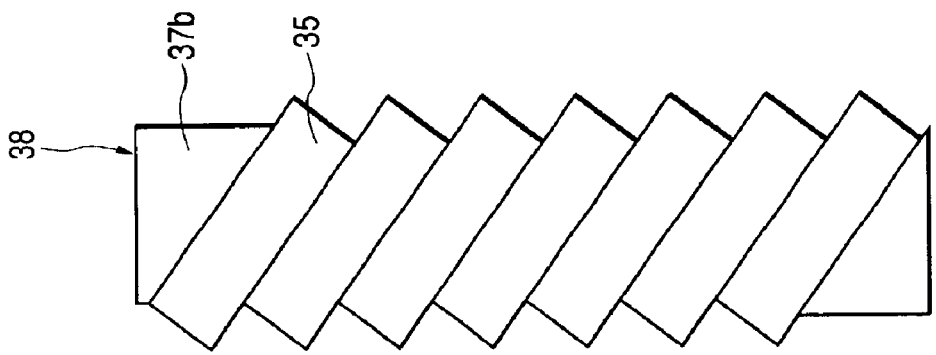
FIG. 12B is a sectional view as viewed in a direction B in FIG. 12A.
Figure 12A:
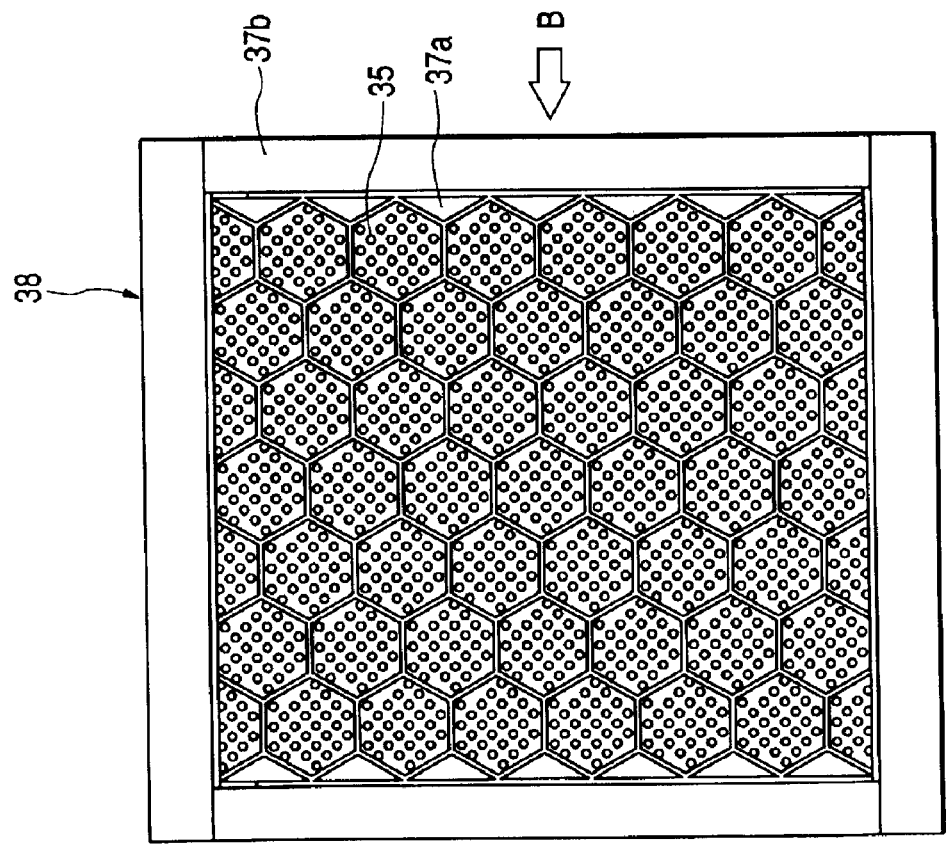
FIG. 12A is a plan view of a large area fiber plate.
Figure 13:
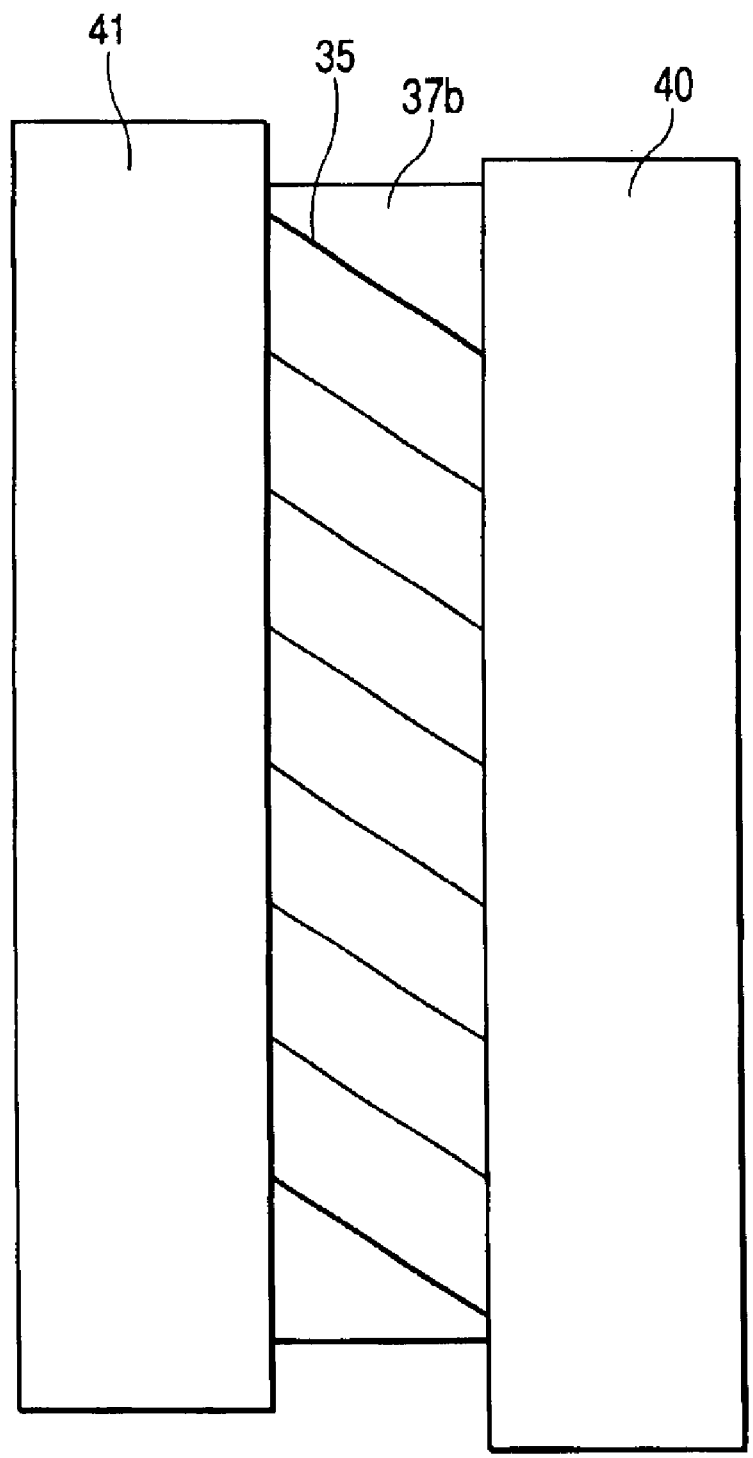
FIG. 13 is a view showing a process of polishing the large area fiber plate.

In the first and second embodiments discussed above, the axis of the fiber is parallel to a normal line of the light guide surface of the fiber plate. According to a third embodiment, however, the multiple fibers are, when laminated, bonded obliquely, wherein the fiber axis is inclined to the normal line of the light guide surface of the fiber plate. FIG. 12A is a plan view of the large area fiber plate. FIG. 12B is a sectional view as viewed in the direction B in FIG. 12A. FIG. 13 is a view showing a polishing process thereof.

Multiple fibers 35 are laminated only on sections effective as the FOP (Fiber Optical Plate), and portions peripheral to the FOP are formed as blank glass blocks 37a, 37b, whereby a quantity of the high-cost multiple fibers used can be decreased. After hardening the bonding agent, the whole block is cut off obliquely and in the lengthwise direction of the fiber and are, as shown in FIG. 13, polished by use of polishing materials 40, 41, whereby the FOP can be acquired. The numeral 38 denotes a large area fiber plate.

The use of the fiber plate of the obliquely-aligned multiple fibers 35 may not require the X-ray shielding agent to be contained in the bonding agent. This is because the X-rays traveling from the perpendicular direction invariably impinge upon the fibers.

Figure 14:
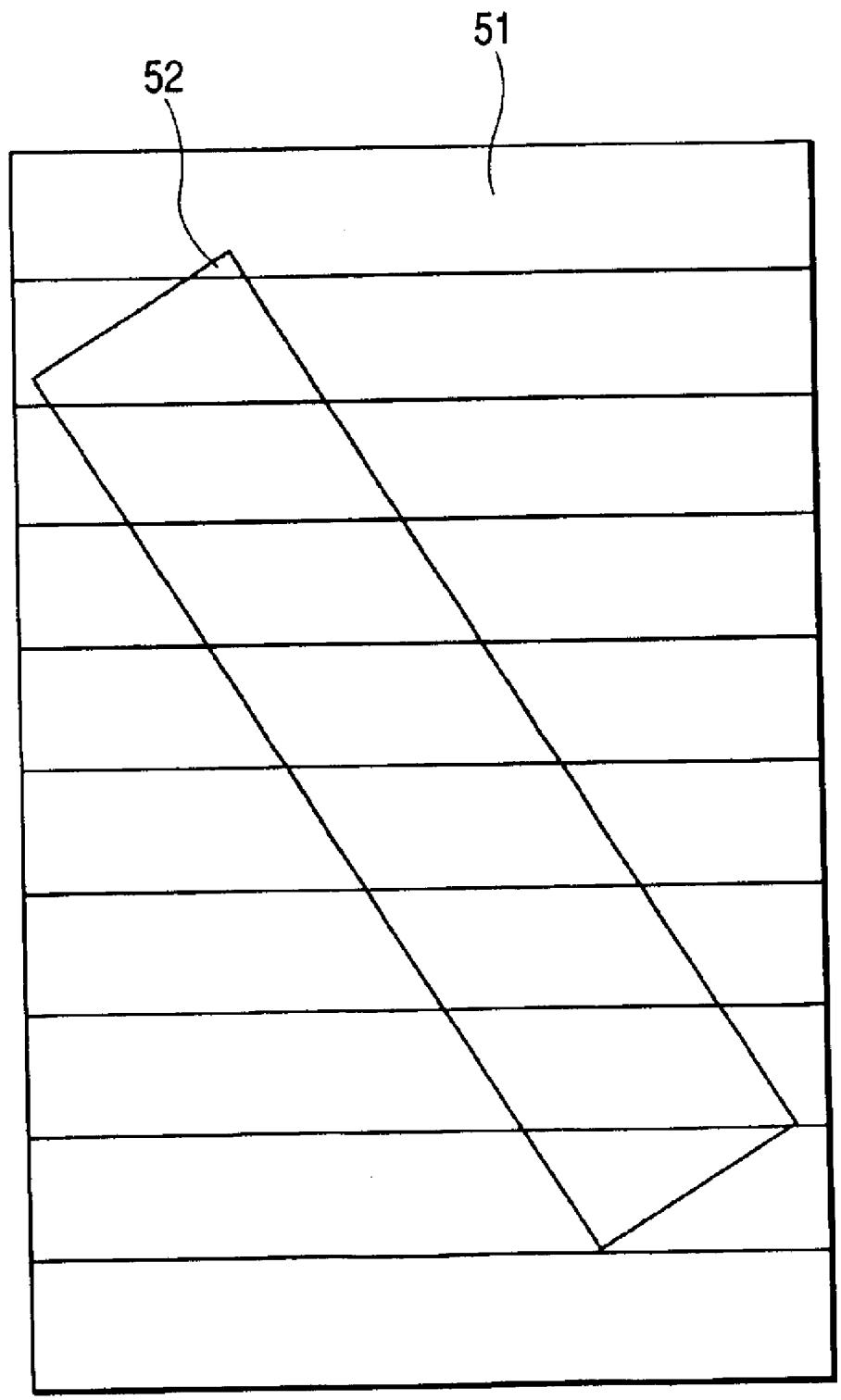
FIG. 14 is an explanatory view showing a case of manufacturing a fiber 52 inclined by polishing after press working.

In the case of manufacturing a fiber 52 inclined by polishing after the press working, as shown in FIG. 14, a fiber portion 51 excluding the fiber 52 becomes futile.

Herein, an angle inclined to the normal line will be explained in depth with reference to FIGS. 15A, 15B and 15C through 17.

Figure 15A:
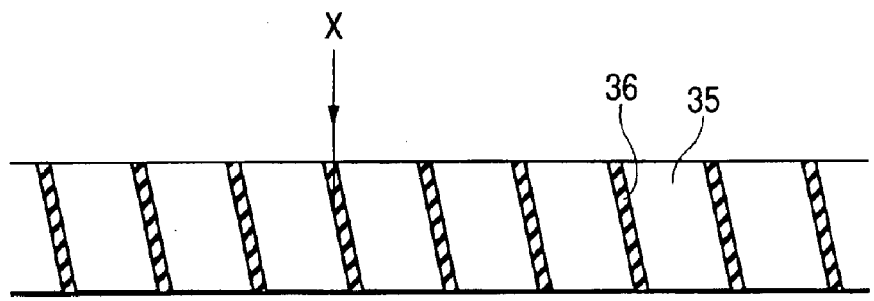
FIGS. 15A, 15B and 15C are explanatory views showing how the light is incident in a case where a fiber axis is inclined to a normal line of a light guide surface of the fiber plate.
Figure 15B:
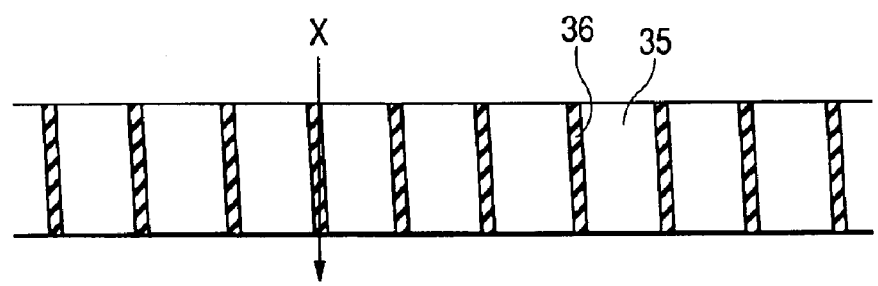

FIG. 15A is a sectional view of the large area fiber plate in the third embodiment. The numeral 35 denotes the multiple fiber, and 36 represents a bonding agent. In the case of configuring and utilizing the X-ray imaging apparatus by use of these large area fiber plates, normally the X-rays becomes incident in the direction of the normal line of the light guide surface of the fiber plate as indicated an arrowhead X in FIG. 15A, and some X-rays get incident on the bonding agent. The X-rays having entered the bonding agent penetrate inside the bonding agent because of the bonding agent having a small absorption of the X-ray. In the third embodiment, however, the fiber axis within the multiple fiber 35 is inclined to the incidence of the X-ray, and hence the X-rays entering the bonding agent invariably impinge on the fibers but never exit the surface opposite to the X-ray incident surface of the large area fiber plate. By contrast, as shown in FIG. 15B, if the angle of the fiber axis from the normal line of the light guide surface of the fiber plate is small, it follows that some X-rays, as illustrated therein, exit the surface opposite to the X-ray incident surface of the large area fiber plate. Further, if the amount of the bonding agent 36 is large and multiple fibers 35 adjacent to each other are disposed at a comparatively large distance from each other even when the angle of the fiber axis from the normal line of the light guide surface of the fiber plate as in the case of FIG. 15C is the same with the third embodiment (FIG. 15A), it follows that some X-rays entering the bonding agent exit the surface opposite to the X-ray incident surface of the large area fiber plate as illustrated therein.

Figure 15C:
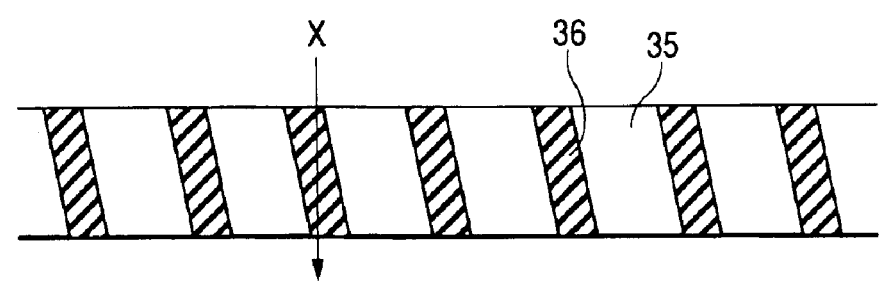

If the X-rays exit the surface opposite to the X-ray incident surface of the large area fiber plate as seen in FIGS. 15B and 15C, the X-rays get incident directly on the imaging device in the X-ray imaging apparatus using these fiber plates, which turns out to be noises when in a reading process, and further there might be a case where semiconductor crystals within the imaging device are destructed, resulting in deterioration of the characteristics.

The angle of the fiber axis with respect to the direction of the normal line of the light guide surface of the fiber plate in the third embodiment, will be explained in detail referring to FIGS. 16 and 17.

Figure 16:
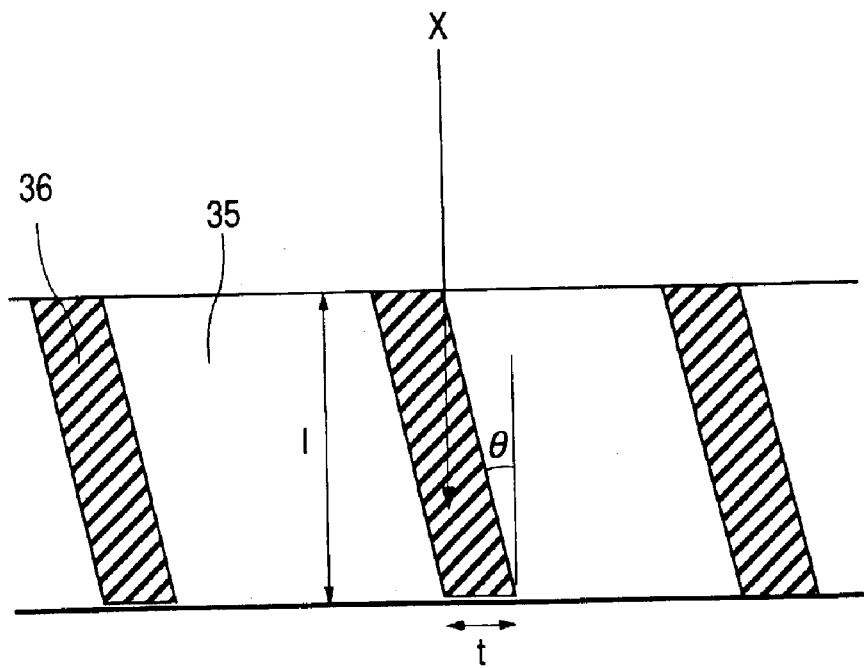
FIG. 16 is an explanatory view showing an angle made by the fiber axis and the direction of the normal line of the light guide surface of the fiber plate.

Referring first to FIG. 16, the symbol θ represents the angle of the fiber axis with respect to the direction of the normal line of the light guide surface of the fiber plate, t designates a distance between the multiple fibers 35 adjacent to each other, and l denotes a thickness of the large area fiber plate. A condition that the X-rays incident in the direction of the normal line invariably impinge on the fibers, may suffice if established as follows:

$$\theta > \tan^{-1}(t/l) \quad (1)$$

where $\tan^{-1}$ is an inverse function of tangent, which is, i.e., arctangent. Namely, the axes of the multiple fibers 35 are inclined to satisfy the above formula (1), and the same fibers 35 are bonded obliquely. With this configuration, the X-rays neither directly enter the imaging device nor become the noises when in the reading process in the X-ray imaging apparatus using the multiple fibers 35 without the X-ray shielding agent contained in the bonding agent. Further, the semiconductor crystals within the imaging device are not destroyed, and there deterioration of the characteristics does not occur.

Figure 17:
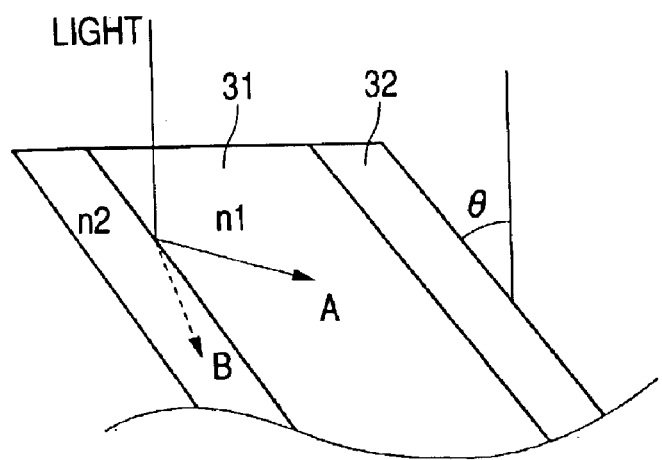
FIG. 17 is an explanatory view showing an angle between the fiber axis and the direction of the normal line of the light guide surface with respect to one single fiber of a multiple fiber.

Moreover, FIG. 17 illustrates one piece of fiber in the multiple fiber. The numeral 31 represents a core glass, and $n_1$ denotes a refractive index thereof. The numeral 32 designates a clad glass, and $n_2$ denotes a refractive index thereof. Further, θ stands for an angle between the fiber axis and the direction of the normal line of the light guide surface of the fiber plate. A phosphor or the like exists, though not illustrated, on this fiber, and the X-rays becomes incident, thereby emitting the visible light. This beam of light enters the incident surface of the core glass 31 of the fiber from the direction of the normal line, as the light exhibiting the largest intensity. This beam of light indicated by "Light" in FIG. 17 is incident upon an interface between the core glass 31 and the clad glass 32 and must be, as the X-ray imaging apparatus is required to operate, reflected in the direction A as indicated by an arrowhead in FIG. 17. If θ is larger than needed, however, it follows that the light penetrates the clad glass 32 in the direction B as indicated by an arrowhead of a broken line in FIG. 17, and this beam of light is absorbed by the unillustrated absorbent glass.

The condition for reflecting in the direction A as indicated by the arrowhead in FIG. 17 must be given by:

$$n_1 \cos \theta > n_2$$

Namely, θ must satisfy the following relationship:

$$\theta < \cos^{-1}(n_2/n_1) \quad (2)$$

where $\cos^{-1}$ is an inverse function of cosine, which is, i.e., arccosine.

That is, in combination with the formula (1) given above, the axis of the multiple fiber 35 is inclined at the angle θ that satisfies the following formula (3):

$$\tan^{-1}(t/l) < \theta < \cos^{-1}(n_2/n_1) \quad (3)$$

Then, the multiple fibers 35 are bonded obliquely. This configuration enables prevention of the X-rays from entering directly the imaging device without the X-ray shielding agent contained in the bonding agent, and this does not cause the noises when in the reading process. Further, the light incident upon the fibers can be transmitted at a high efficiency, and hence the X-ray imaging apparatus having a high sensitivity can be attained.

(Radiation Imaging System)

A radiation imaging system that will hereinafter be described takes a mode of a system utilizing the imaging apparatus in each of the embodiments discussed above.

Figure 18:
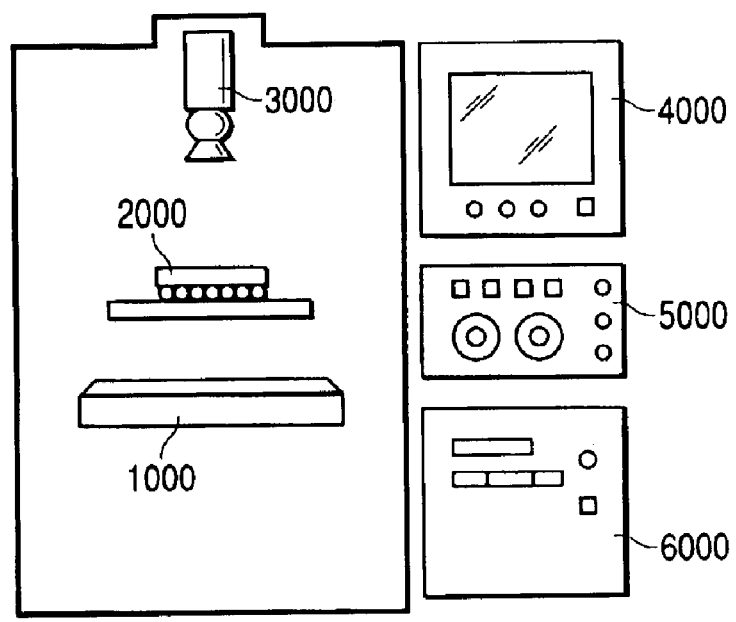
FIG. 18 is a schematic view showing a structure of a non-destructive inspection system including the X-ray imaging apparatus of the present invention.

FIG. 18 is a conceptual view showing a structure of a non-destructive inspection system including the X-ray imaging apparatus.

FIG. 18 shows an X-ray imaging apparatus 1000 in each of the embodiments discussed above, an object 2000 defined as a non-destructive inspection object incorporated into, e.g., an electric appliance, a micro focus X-ray generator 3000 serving as a radiation source for irradiating the object 2000 with the X-rays, an image processing apparatus 6000 for processing signals outputted from the X-ray imaging apparatus 1000, a monitor 4000 defined as a display means for displaying an image processed by the image processing apparatus 6000, and a controller 5000 for controlling the imaging processing apparatus 6000 and the monitor 4000.

In the non-destructive inspection system illustrated in FIG. 18, when the object 2000 that is to undergo a non-destruction inspection is irradiated with the X-rays generated by the micro focus X-ray generator 3000, information indicating whether or not there exists destruction inside the object 2000 is outputted via the X-ray imaging apparatus 1000 to the image processing apparatus 6000. In the image processing apparatus 6000, the outputted signals are processed as image signals between peripheral pixels of each imaging device 1 described above, and a dark signal correction is effected according to the necessity, thereby displaying these signals as an image on the monitor 4000.

The image displayed on the monitor 4000 can be, for example, enlarged or reduced and controlled in density by inputting instructions through the controller 5000. Thus, it is inspected whether there is the destruction inside the object 2000 through the image displayed on the monitor 4000. Then, if no destruction is detected from the object 2000, the object 2000 is judged to be a well-manufactured product and incorporated into the electric appliance. Whereas if the destruction is detected from the object 2000, the object 2000 is judged defective and excluded from the manufacturing process.

Figure 19:
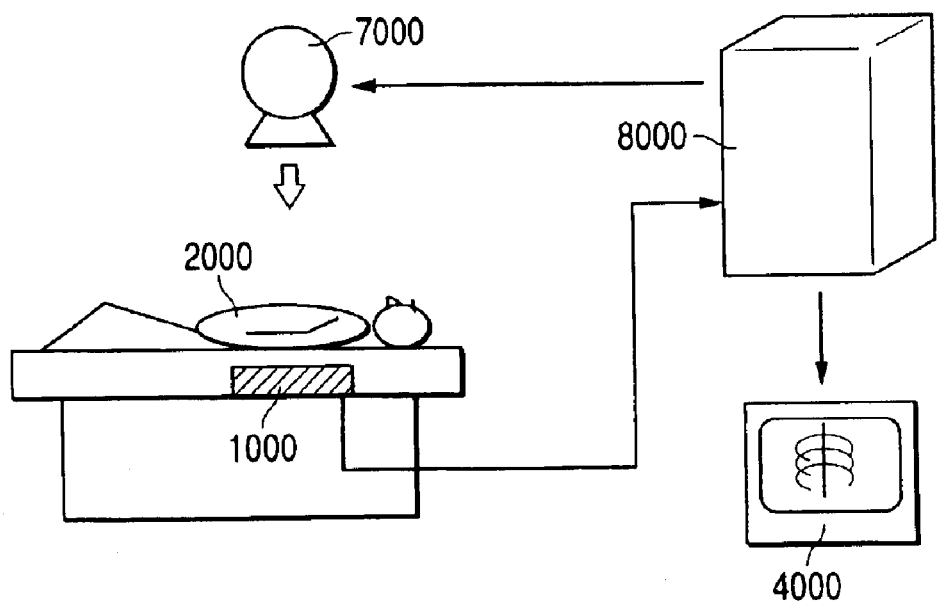
FIG. 19 is a schematic view showing a structure of an X-ray diagnosis system including the X-ray imaging apparatus of the present invention.
Figure 20:
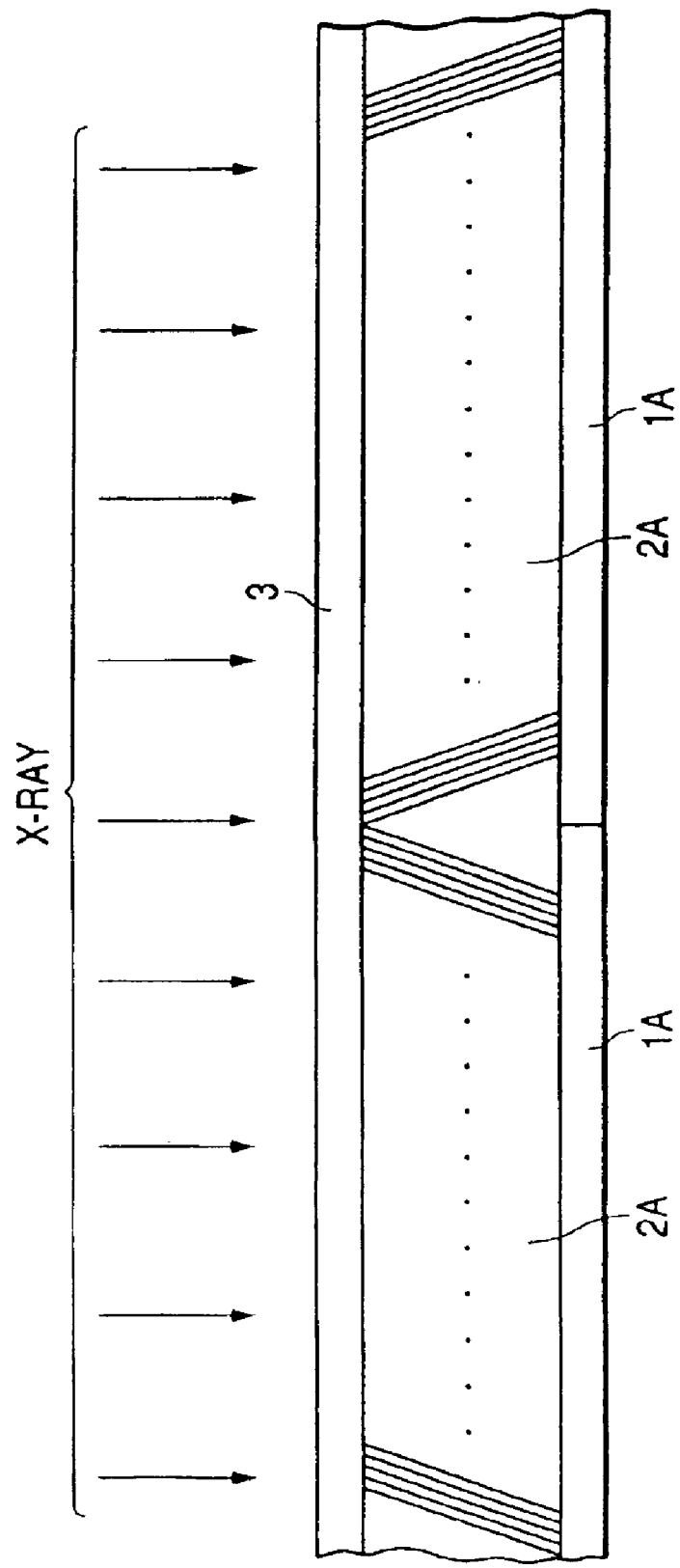
FIG. 20 is a schematic sectional view of an imaging apparatus using a conventional large area fiber plate.
Figure 21:
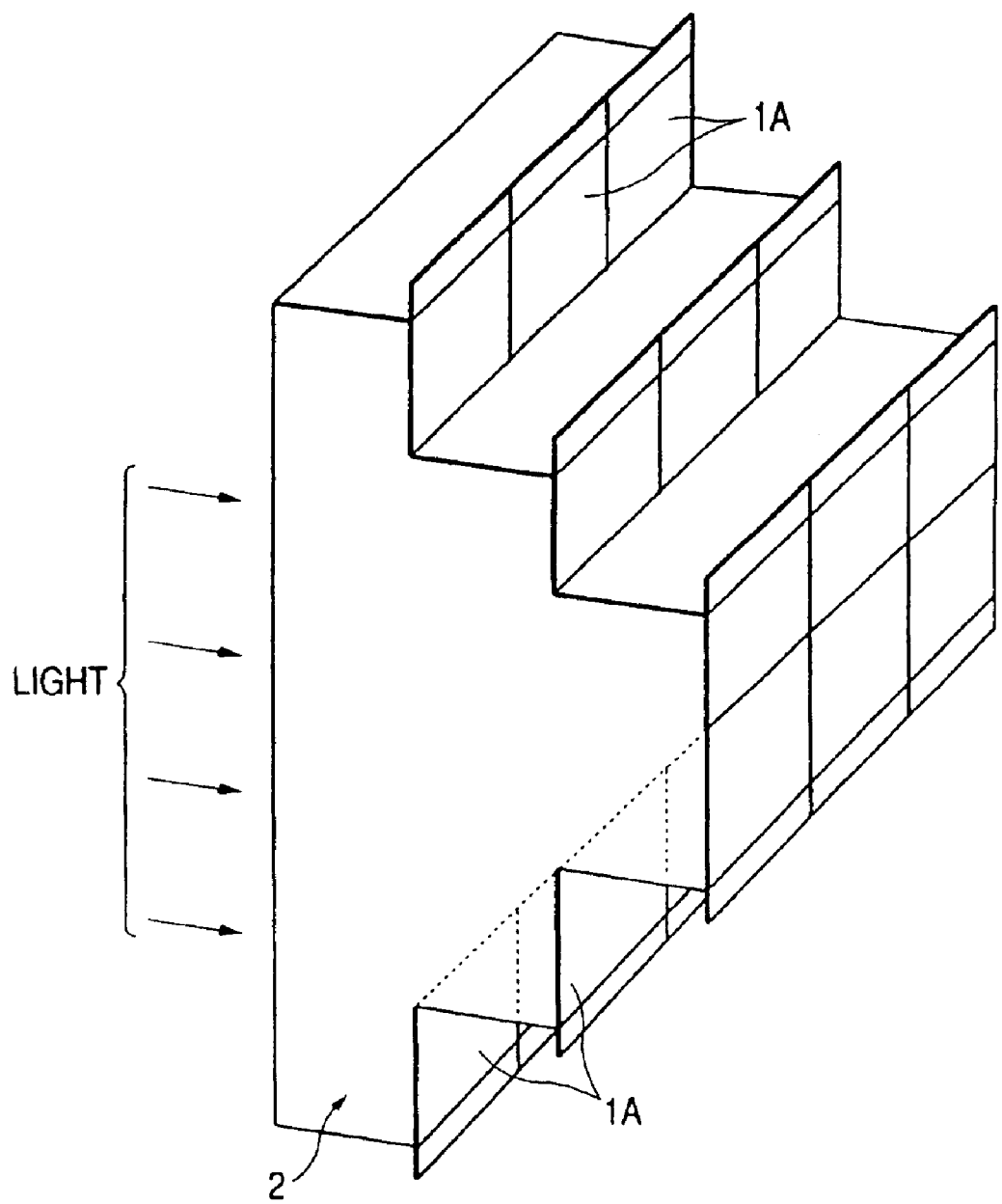
FIG. 21 is a schematic sectional view of the imaging apparatus using another conventional large area fiber plate.

FIG. 19 is a conceptual view showing a structure of an X-ray diagnosis system including the X-ray imaging apparatus in each of the embodiments discussed above.

FIG. 19 shows a bed equipped with the X-ray imaging apparatus 1000, an X-ray generating apparatus 7000 as a radiation source for irradiating a subject 2000 with the X-rays, an image processor 8000 for processing image signals outputted from the X-ray imaging apparatus 1000 and controlling a timing, etc. of the X-ray irradiation from the X-ray generating apparatus 7000, and the monitor 4000 as a display means for displaying the image signals processed by the image processor 8000. Note that the same components as those shown in FIG. 18 are marked with the same numerals in FIG. 19.

In the X-ray diagnosis system shown in FIG. 19, the X-ray generating apparatus 7000 generates the X-rays based on an instruction given from the image processor 8000, and irradiates the subject 2000 on the bed with the X-rays. Then, radioscopic information on the subject 2000 is outputted via the X-ray imaging apparatus 1000 to the image processor 8000. In the image processor 8000, the outputted signals are processed as image signals between the peripheral pixels of each imaging device 1 described above and undergo a dark correction, and the thus processed image signals are stored on an unillustrated memory and displayed as an image on the monitor 4000.

The image displayed on the monitor 4000 can be, for example, enlarged or reduced and controlled in density by inputting instructions through the image processor 8000. Thus, a doctor diagnoses the subject 2000 through the image displayed on the monitor 4000.

Further, the radioscopic information about the subject 2000 after diagnosis by the doctor may be, with a recording means provided in this system, recorded on a disk-like recording medium.

As discussed above, according to the present invention, it is possible to provide the large area fiber plate, the radiation imaging apparatus and the radiation imaging system that are small-sized, inexpensive and excellent of the workability in the manufacturing process.

What is claimed is:

1. A fiber plate comprising:

a plurality of fibers; and multi-fibers formed by bundling and drawing the plurality of fibers to take a polygonal shape in section, wherein the fiber plate is configured by bonding the multi-fibers to each other with a bonding agent provided between the multi-fibers, and the bonding agent is hardened at a temperature equal to or lower than 100° C., in a state of keeping the polygonal shape in section after bundling and drawing the plurality of fibers.

2. A fiber plate comprising:

a plurality of fibers;

multi-fibers formed by bundling and drawing the plurality of fibers to take one polygonal shape in section so that the multi-fibers can be air-tightly stacked without any air gap; and multi-fiber aggregates, each formed by bundling and drawing the multi-fibers to take a polygonal shape in section analogous to the one polygonal shape in section or to take another polygonal shape in section different than the one polygonal shape in section, which shapes enable air-tight stacking with no air gap, wherein the fiber plate is configured by air-tightly bonding the multi-fiber aggregates to each other with a bonding agent without the air gap in a state of keeping the one or another polygonal shape in section after bundling and drawing the plurality of the multi-fibers.

3. A fiber plate according to claim 1 or 2, wherein:

fiber blocks are formed by air-tightly bonding the multi-fibers or the multi-fiber aggregates to each other with the bonding agent without the air gap; and the fiber plate is configured by bonding the fiber blocks to each other with the bonding agent, so that each of the fiber blocks constitutes each part of the fiber plate.

4. A fiber plate according to claim 1, wherein an axis of each of the fibers is inclined to a normal line of a light guide surface of the fiber plate.

5. A fiber plate according to claim 4, wherein a following relationship is established:

$$\theta > \tan^{-1}(t/l)$$

where $\theta$ is an angle between the fiber axis and a direction of the normal line of the light guide surface of the fiber plate, t is a distance between the fibers adjacent to each other, and l is a thickness of the fiber plate.

6. A fiber plate according to claim 4, wherein a following relationship is established:

$$\theta < \cos^{-1}(n_2/n_1)$$

where $n_1$ is a refractive index of a core glass of the fiber, $n_2$ is a refractive index of a clad glass of the fiber, $\theta$ is an angle between the fiber axis and a direction of the normal line of the light guide surface of the fiber plate.

7. A fiber plate according to claim 4, wherein a following relationship is established:

$$\tan^{-1}(t/l) < \theta < \cos^{-1}(n_2/n_1)$$

where $\theta$ is an angle between the fiber axis and a direction of the normal line of the light guide surface of the fiber plate, t is a distance between the fibers adjacent to each other, l is a thickness of the fiber plate, $n_1$ is a refractive index of a core glass of the fiber, and $n_2$ is a refractive index of a clad glass of the fiber.

8. A fiber plate according to claim 1, wherein the light guide surface of the fiber plate is a polished surface.

9. A fiber plate according to claim 1, wherein the bonding agent is a bonding agent containing a radiation shielding filler.

10. A fiber plate manufacturing method comprising:

a step of manufacturing a multi-fiber by bundling and drawing a plurality of fibers to take a polygonal shape in section; and a step of manufacturing a fiber plate by bonding the multi-fibers to each other with a bonding agent, hardened at a temperature equal to or lower than 100° C., in a state of keeping the polygonal shape in section after bundling and drawing the plurality of fibers.

11. A fiber plate manufacturing method comprising:

a step of manufacturing multi-fibers by bundling and drawing a plurality of fibers to take one polygonal shape in section so that the multi-fibers can be air-tightly stacked without any air gap;

a step of manufacturing multi-fiber aggregates by bundling and drawing the multi-fibers to take a polygonal shape in section analogous to the one polygonal shape in section or to take another polygonal shape in section different than the one polygonal shape in section, which shapes enable air-tight stacking with no air gap; and a step of manufacturing a fiber plate by air-tightly bonding the multi-fiber aggregates to each other with a bonding agent without the air gap in a state of keeping the one or another polygonal shape in section after bundling and drawing the plurality of the multi-fibers.

12. A fiber plate manufacturing method according to claim 10 or 11, wherein the fiber plate manufacturing step comprises manufacturing fiber blocks by air-tightly bonding the multi-fibers or the multi-fiber aggregates to each other with the bonding agent without the air gap, and bonding the fiber blocks to each other with the bonding agent, so that each of the fiber blocks constitutes each part of the fiber plate.

13. A radiation imaging apparatus comprising:

a wavelength converting member for converting radiation into a light;

a photoelectric converting element for converting the light into an electric signal; and the fiber plate according to claim 1 or 2 provided between the wavelength converting member and the photoelectric converting element.

14. A radiation imaging system comprising:

the radiation imaging apparatus according to claim 13;

signal processing means for processing a signal from the radiation imaging apparatus;

recording means for recording a signal from the signal processing means;

display means for displaying the signal from the signal processing means; and a radiation source for generating the radiation.

15. A fiber plate comprising:

a plurality of fibers; and multi-fibers formed by bundling and drawing the plurality of fibers to take a polygonal shape in section so that the multi-fibers can be air-tightly stacked without any air gap, wherein the fiber plate is configured by air-tightly bonding the multi-fibers to each other with a bonding agent without the air gap in a state of keeping the polygonal shape in section after bundling and drawing the plurality of fibers, fiber blocks are each formed by air-tightly bonding the multi-fibers to each other with the bonding agent without the air gap; and the fiber plate is configured by bonding the fiber blocks to each other with the bonding agent.

16. A fiber plate manufacturing method comprising:

a step of manufacturing multi-fibers by bundling and drawing a plurality of fibers to take a polygonal shape in section so that the multi-fibers can be air-tightly stacked without any air gap; and a step of manufacturing a fiber plate by air-tightly bonding the multi-fibers to each other with a bonding agent without the air-gap in a state of keeping the polygonal shape in section after bundling and drawing the plurality of fibers, wherein the fiber plate manufacturing step comprises manufacturing fiber blocks by air-tightly bonding the multi-fibers to each other with the bonding agent without the air gap, and bonding the fiber blocks to each other with the bonding agent.

17. A fiber plate manufacturing method according to claim 11, wherein an axis of each of the fibers is inclined to a normal line of a light guide surface of the fiber plate.

18. A fiber plate according to claim 2, wherein said bonding agent is hardened at a temperature equal to or lower than 100° C.

* * * * *

UNITED STATES PATENT AND TRADEMARK OFFICE
CERTIFICATE OF CORRECTION

PATENT NO. : 6,928,218 B2
DATED : August 9, 2005
INVENTOR(S) : Kohei Nakata et al.

It is certified that error appears in the above-identified patent and that said Letters Patent is hereby corrected as shown below:

Column 5,
Line 12, "an numerical" should read -- a numerical --.
Line 30, "multi fiber" should read -- multi-fiber --.

Column 6,
Line 10, "plate." should read -- plate --.
Line 51, "an urotropin" should read -- a urotropin --.

Column 7,
Line 46, "the a" should read -- the --.

Column 10,
Line 7, "indicated" should read -- indicated by --.

Signed and Sealed this

Twenty-eighth Day of March, 2006

JON W. DUDAS
*Director of the United States Patent and Trademark Office*